(12) United States Patent
Hermann (10) Patent No.: US 7,866,004 B1
(45) Date of Patent: *Jan. 11, 2011

(54) HANDLE ADAPTOR FOR TRANSPORT CARTS AND THE LIKE AND ASSOCIATED METHOD

(76) Inventor: Jim Hermann, P.O. Box 422, Lebanon, NJ (US) 08833

( * ) Notice: Subject to any disclaimer, the term of this patent is extended or adjusted under 35 U.S.C. 154(b) by 382 days.

This patent is subject to a terminal disclaimer.

(21) Appl. No.: 12/009,385

(22) Filed: Jan. 22, 2008

Related U.S. Application Data (63) Continuation-in-part of application No. 11/803,168, filed on May 14, 2007, now Pat. No. 7,657,973.

(51) Int. Cl.
*B25G 1/00* (2006.01)

(52) U.S. Cl. .......................... 16/426; 16/422; 16/110.1

(58) Field of Classification Search .................. 16/426, 16/427, 430, 110.1, 422, 112.1, 113, 434, 16/373, 436, 437, 438, 440, 444, 445, 446; 294/58; 280/47.31, 288.4, 47.3, 47.315; 81/177.2, 177.7; 56/239
See application file for complete search history.

(56) References Cited

U.S. PATENT DOCUMENTS

| | | | | |
|---|---|---|---|---|
| 626,736 A * | 6/1899 | Taulbee | | 280/290 |
| 629,858 A * | 8/1899 | Hollenbeck | | 16/373 |
| 826,257 A * | 7/1906 | Kountz | | 16/373 |
| 1,258,503 A * | 3/1918 | Tritle | | 16/233 |
| 3,574,380 A * | 4/1971 | Tague | | 294/16 |
| 4,128,266 A * | 12/1978 | Vaslas | | 294/58 |
| 4,229,033 A * | 10/1980 | Vosbikian | | 294/58 |
| 5,326,122 A * | 7/1994 | Duffy | | 280/288.4 |
| 5,379,758 A * | 1/1995 | Snyder | | 16/430 |
| 5,383,677 A * | 1/1995 | Thomas et al. | | 280/288.4 |
| 5,411,305 A * | 5/1995 | Revoldt | | 294/58 |
| 5,791,675 A * | 8/1998 | Fleischer | | 280/293 |
| 5,794,307 A | 8/1998 | Overcash | | |
| 5,810,375 A | 9/1998 | Hoffarth | | |
| 5,944,333 A * | 8/1999 | Kent | | 280/204 |
| 6,050,584 A * | 4/2000 | Sibson | | 280/283 |
| 6,120,050 A * | 9/2000 | Tillim | | 280/293 |
| 6,349,958 B1 * | 2/2002 | Gawlik | | 280/293 |
| 6,464,272 B1 * | 10/2002 | Michaud | | 294/58 |

(Continued)

FOREIGN PATENT DOCUMENTS

GB 2246544 A * 2/1992

(Continued)

*Primary Examiner*—Victor Batson
*Assistant Examiner*—Jeffrey O'Brien (57) ABSTRACT

A handle adaptor for transport carts includes a block-shaped lower member with first, second, third and fourth upper surfaces with inner edges. The inner edges are disposed below the inner edges of the first and second upper surfaces. A fifth upper surface is formed the inner edges and coextensively shaped posts are monolithically formed with the outside faces of the lower member. The posts have apertures formed in distal ends. A block-shaped upper member has lower surfaces with a passageway surrounding the proximal ends of the handles of the transport. The upper member further includes a curved flange with a groove that receives and captures an extension. The upper and lower members have passageways. A support plate includes a bracket with threaded shafts and a centrally registered slot. A cover has threaded aperture and a centrally registered slot. The adjustably pivoting mechanism includes a plurality of cotter pins.

8 Claims, 7 Drawing Sheets

U.S. PATENT DOCUMENTS

| | | | | |
|---|---|---|---|---|
| 6,474,670 B2 | * | 11/2002 | Shaw | 280/299 |
| 6,550,104 B2 | | 4/2003 | Cacciacarne | |
| D484,023 S | * | 12/2003 | Stout | D8/107 |
| 6,704,968 B2 | * | 3/2004 | Lau | 16/426 |
| 6,883,845 B2 | * | 4/2005 | Douziech | 294/58 |
| 7,331,620 B2 | * | 2/2008 | Wang | 294/58 |
| 2003/0057721 A1 | * | 3/2003 | Ducklow | 294/58 |

FOREIGN PATENT DOCUMENTS

WO     WO 9116231 A1 * 10/1991

* cited by examiner

HANDLE ADAPTOR FOR TRANSPORT CARTS AND THE LIKE AND ASSOCIATED METHOD

CROSS REFERENCE TO RELATED APPLICATIONS

This application claims the benefit of U.S. patent application Ser. No. 11/803,168, filed May 14, 2007 now U.S. Pat. No. 7,657,973, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to adaptors and, more particularly, to a handle adaptor for assisting a user to operate a transport cart and the like safely and easily.

2. Prior Art

Wheelbarrows typically are standardized in configuration and dimension for use by persons of average stature. Ideally an operator of a wheelbarrow having a load should be able to pickup up the handles of the wheelbarrow with only a slight bend in the knees so that undue strain is not placed on the operator's back or knees. People having a taller than average stature are many times disadvantaged in the use of wheelbarrows and similar devices having straight, shaft-like handles, in that typically they must bend over to reach and firmly grasp the handles during use. When a wheelbarrow is heavily loaded, tall people required to use the original wheelbarrow handles made for comfortable use by shorter people can easily injure their back.

One prior art example shows a back saving handle extension for attachment to the straight, shaft-like type of handle typically found on a wheelbarrow which allows a person of taller than average stature to effectively use the wheelbarrow, or similar device, without having to bend over excessively to do so. It is contemplated for a pair of extensions to be employed for most effective use of a device having two handles, with one extension being connected to each handle. Each extension comprises an arcuate tubular member having a flexible hand grip attached to its distal end and connection means securely attaching its other end to the distal end of a straight wheelbarrow-type of handle.

For use of a wheelbarrow by only people of taller than average stature, the extension may be positioned in a vertical orientation with its hand grip substantially above its arcuate member. For alternative use of a wheelbarrow by shorter people and people of taller than average stature, without the need to remove the extensions between such alternative use, extensions may be positioned in an orientation sufficiently laterally displaced from vertical wherein the shorter people can still reach and use the straight, shaft-like handles without interference from the extension hand grips. Applications may include, but are not limited to, use with wheelbarrows, garden carts, and other apparatus having handles. Unfortunately, this prior art example does not provide a means of stabilizing a user hand and arm during operating conditions and thereby allow a user to more easily operate the implement.

Another prior art example shows a wheelbarrow handle adapter that has an adapter handle with a proximal end and a distal end with an approximate right angle bend therebetween. The adapter handle at the proximal end is attachable to a wheelbarrow handle. In one configuration a sleeve is inserted onto the end of the wheelbarrow handle and a handle bolt is inserted through the adapter handle intermediate of the distal end and the proximal end to threadably engage the sleeve. In an alternate configuration the adapter handle has a tubular opening at the distal end that is curved sufficiently to insert the tubular opening onto the end of the wheelbarrow handle. Unfortunately, this prior art example is not adjustable, and also does not provide support to a user hand and arm during operating conditions.

Accordingly, a need remains for a handle adaptor for transport carts and the like in order to overcome the above-noted shortcomings. The present invention satisfies such a need by providing an apparatus that is convenient and easy to use, lightweight yet durable in design, and assists a user to operate a transport cart safely and easily. Such an adaptor makes gripping, lifting, and maneuvering a transport cart less physically demanding by adding support, stability, and comfort to a user hands and arms. The adaptor effectively transfers leverage to a user upper arm and allows a user to manipulate a transport cart more easily. This results in a more effective application of upper body strength to push a given weight of material. The present invention is simple to use, inexpensive, and designed for many years of repeated use.

BRIEF SUMMARY OF THE INVENTION

In view of the foregoing background, it is therefore an object of the present invention to provide an apparatus for assisting a user to operate a transport cart safely and easily. These and other objects, features, and advantages of the invention are provided by a handle adaptor for transport carts and the like.

The apparatus includes a block-shaped lower member which conveniently has first and second upper surfaces provided with inner edges extending inwardly from outer faces of the lower member and terminating proximal to a centrally registered longitudinal axis of the lower member. Such a lower member further has third and fourth upper surfaces monolithically formed with the inner edges of the first and second upper surfaces respectively and oriented orthogonal thereto. Such third and fourth upper surfaces effectively have inner edges extending inwardly from the inner edges of the first and second upper edges and further terminate proximal of the longitudinal axis. Such inner edges of the third and fourth upper surfaces are advantageously disposed below the inner edges of the first and second upper surfaces.

The lower member further has a fifth upper surface monolithically formed with the inner edges of the third and fourth upper surfaces respectively and positioned therebetween. Such a fifth surface is conveniently located subjacent to the first and second upper surfaces respectively and is oriented parallel thereto. The lower member further includes a pair of coextensively shaped posts monolithically formed with the outside faces of the lower member. Such posts effectively have a hollow passageway formed therein and a centrally registered axis oriented perpendicular to the longitudinal axis of the lower member. The posts further have apertures advantageously formed in distal ends thereof respectively and oriented perpendicular to the centrally registered axis. The open end of the closed end of an extension resiliently articulates to a plurality of positions above an upper member and is thereby prohibited from pivoting below the lower member.

The apparatus further includes a block-shaped upper member with lower surfaces coextensively and inversely positioned with the upper surfaces of the lower member such that a passageway is formed therebetween when the upper and lower members are joined together. Such a passageway conveniently surrounds the proximal ends of the handles of the transport cart during operating conditions. The upper member further includes a curved flange monolithically formed with outside faces of the upper member. Such a flange effectively has a vertically oriented groove formed therein and extends the entire height of the upper member. Such a groove has an open face oriented toward the proximal ends of the handles during operating conditions and the groove receives and captures the extension when the extension is biased upwardly.

The upper and lower members have corresponding threaded passageways formed therein respectively. Such passageways are advantageously oriented at a right angle to the upper and lower surfaces such that the upper and lower members are threadably attached to each other about the proximal ends of the handles of the transport cart during operating conditions.

The apparatus further includes an extension with an open end removably attached to the outside faces of the lower member and a curvilinear support plate removably attached to a closed end of the extension. Such a support plate further includes a bracket integrally attached to a top surface thereof. Such a bracket conveniently has a plurality of threaded shafts formed therein and located at opposed corners thereof. The bracket further has a centrally registered slot monolithically formed therein and a longitudinal axis oriented perpendicular to a longitudinal length of the support plate.

The extension further includes first and second pluralities of circular rings monolithically formed generally medially between the closed and open ends respectively. Such first and second pluralities of circular rings have substantially equal diameters and are juxtaposed adjacent to left and right sides of the open end such that a resilient tension is created when the closed end is articulated along an arcuate path defined above the upper member. The closed end is pivoted about a fulcrum axis passing through a center of the first and second pluralities of the circular rings whereby respective linear segments remain perpendicular to the fulcrum axis.

A cover substantially similar in shape and size to the bracket advantageously has a plurality of threaded apertures formed therein and located at opposite corners thereof such that the apertures correspond to associated ones of the shafts when the cover is threadably attached to the bracket. Such a cover further has a centrally registered slot formed therein. Such a cover slot is in fluid communication with the bracket slot when the cover and the bracket are threadably attached such that a contiguous passageway is thereby formed. The closed end of the extension is conveniently interfitted within the passageway when the cover is threadably attached to the bracket and the support plate is thereby freely pivoted about the closed end of the extension during operating conditions.

The apparatus further includes a mechanism for resiliently articulating the support plate and the closed end of the extension in sync while the open end of the extension remains statically anchored to the lower member such that the support plate and the closed end of the extension return to equilibrium after being articulated to a tensed position above the upper member. Such a resiliently articulating mechanism effectively includes a plurality of cotter pins removably penetrating the apertures of the distal ends of the posts. Such cotter pins prohibit the open end of the extension from prematurely and undesirably disconnecting from the posts during operating conditions while allowing the open end of the extension from prematurely and undesirably disconnecting from the posts during operation conditions while allowing the open end of the extension to resiliently travel about a restricted arcuate path defined above the upper member.

A method for assisting a user to operate a transport cart safely and easily includes the step of providing a block-shaped lower member. Such a lower member has first and second upper surfaces provided with inner edges extending inwardly from outer faces of the lower member and terminating proximal to a centrally registered longitudinal axis of the lower member. The lower member further has third and fourth upper surfaces monolithically formed with the inner edges of the first and second upper surfaces respectively and oriented orthogonal thereto. Such third and fourth upper surfaces have inner edges extending inwardly from the inner edges of the first and second upper edges and terminate proximal of the longitudinal axis. Such inner edges of the third and fourth upper surfaces are disposed below the inner edges of the first and second upper surfaces. The lower member further has a fifth upper surface monolithically formed with the inner edges of the third and fourth upper surfaces respectively and positioned therebetween. Such a fifth surface is located subjacent to the first and second upper surfaces respectively and is oriented parallel thereto.

The method further includes these steps of providing a block-shaped upper member with lower surfaces coextensively and inversely positioned with the upper surfaces of the lower member such that a passageway is formed therebetween when the upper and lower members are joined together. Such a passageway surrounds the proximal ends of the handles of the transport cart during operating conditions.

The steps further include: threadably attaching the upper and lower members to each other and about the proximal ends of the handles of the transport cart; removably and pivotally attaching an open end of an extension to the outside faces of the lower member; removably attaching a curvilinear support plate to a closed end of the extension; and adjustably positioning the extension about the proximal ends of the handles of the transport cart.

The method further includes these steps of: providing a pair of coextensively shaped posts monolithically formed with the outside faces of the lower member and interfitting the open end of the extension about the posts such that the extension is biased to a multitude of positions above and below the proximal ends of the handles during operating conditions. The posts have a hollow passageway formed therein and a centrally registered axis oriented perpendicular to the longitudinal axis of the lower member. The posts further have apertures formed in distal ends thereof respectively and oriented perpendicular to the centrally registered axis.

The method further includes these steps of: biasing the extension upwardly and receiving and capturing the extension within a groove formed in a curved flange monolithically formed with outside faces of the upper member. Such a flange extends the entire height of the upper member. Such a groove has an open face oriented toward the proximal ends of the handles during operating conditions.

The method further includes the step of integrally attaching a bracket to a top surface of the support plate. Such a bracket has a plurality of threaded shafts formed therein and located at opposed corners thereof. The bracket further has a centrally registered slot monolithically formed therein and a longitudinal axis oriented perpendicular to a longitudinal length of the support plate. The steps further include threadably attaching a cover to the bracket. Such a cover is substantially similar in shape and size to the bracket and has a plurality of threaded apertures formed therein and located at opposite corners thereof such that the apertures correspond to associated ones of the shafts when the cover is threadably attached to the bracket. The cover further has a centrally registered slot formed therein and is in fluid communication with the bracket slot when the cover and the bracket are threadably attached such that a contiguous passageway is thereby formed.

The method further includes the step of interfitting the closed end of the extension within the passageway when the cover is threadably attached to the bracket such that the support plate is thereby freely pivoted about the closed end of the extension during operating conditions; and removably penetrating the apertures of the distal ends of the posts with a plurality of cotter pins, the cotter pins prohibiting the open end of the extension from prematurely and undesirably disconnecting from the posts during operating conditions while allowing the open end of the extension to freely rotate about the posts.

The method further includes the steps of: providing lower and upper members; attaching the lower and upper members to the existing cart such that a passageway is formed between the lower and upper members; removably attaching an open end of an extension to outside faces of the lower member; removably attaching a curvilinear support plate to a closed end of the extension; and resiliently articulating the support plate and the closed end of the extension in sync while the open end of the extension remains statically anchored to the lower member such that the support plate and the closed end of the extension return to equilibrium after is articulated to a tensed position above the upper member.

The method further includes the steps of: providing first and second pluralities of circular rings monolithically formed generally medially between the closed and open ends respectively; creating a resilient tension at the first and second pluralities of circular rings by articulating the closed end along an arcuate path defined above the upper member; and maintaining respective linear extension segments perpendicular to a fulcrum axis passing through the first and second pluralities of circular rings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL
VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-7 by the reference numeral 10 and is intended to provide a handle adaptor for transport carts and the like. It should be understood that the apparatus 10 may be used to adapt many different types of handles and should not be limited to adapting only those types of handles mentioned herein. For example, various transport carts, wheel barrows, buggies, power-operated hand-held devices, manually-operated hand-held devices, etc. may be employed by the present invention.

Figure 1:
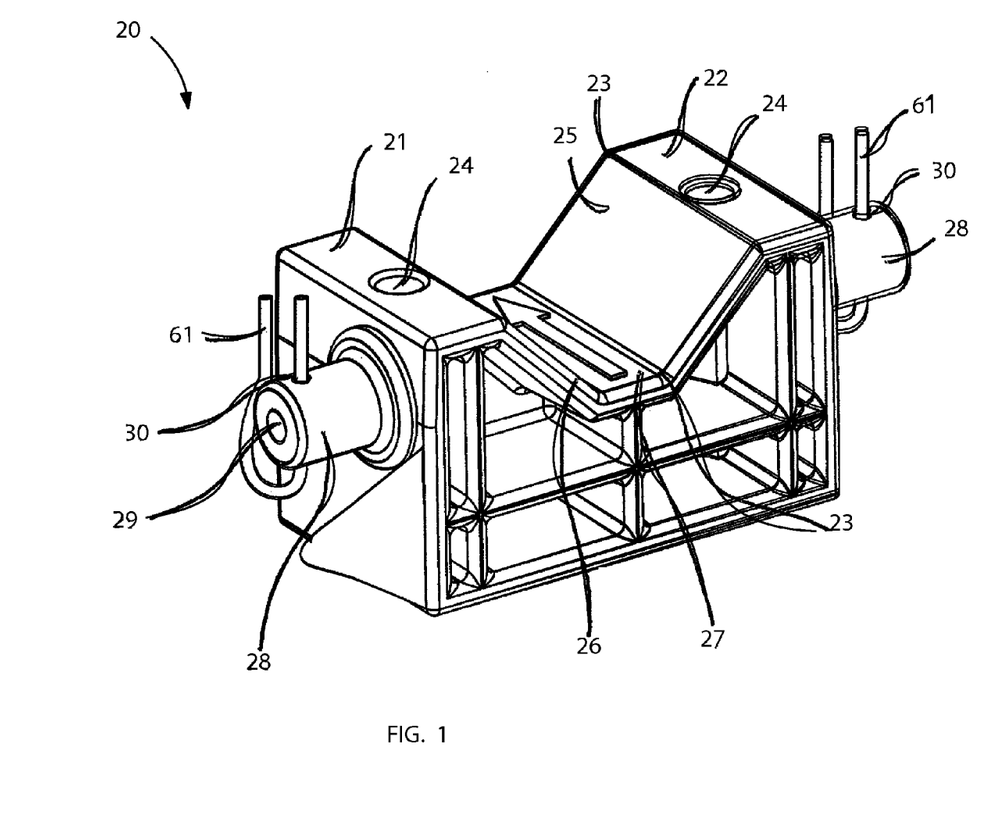
FIG. 1 is a perspective view of the lower member as shown in FIG. 6, in accordance with the present invention.
Figure 6:
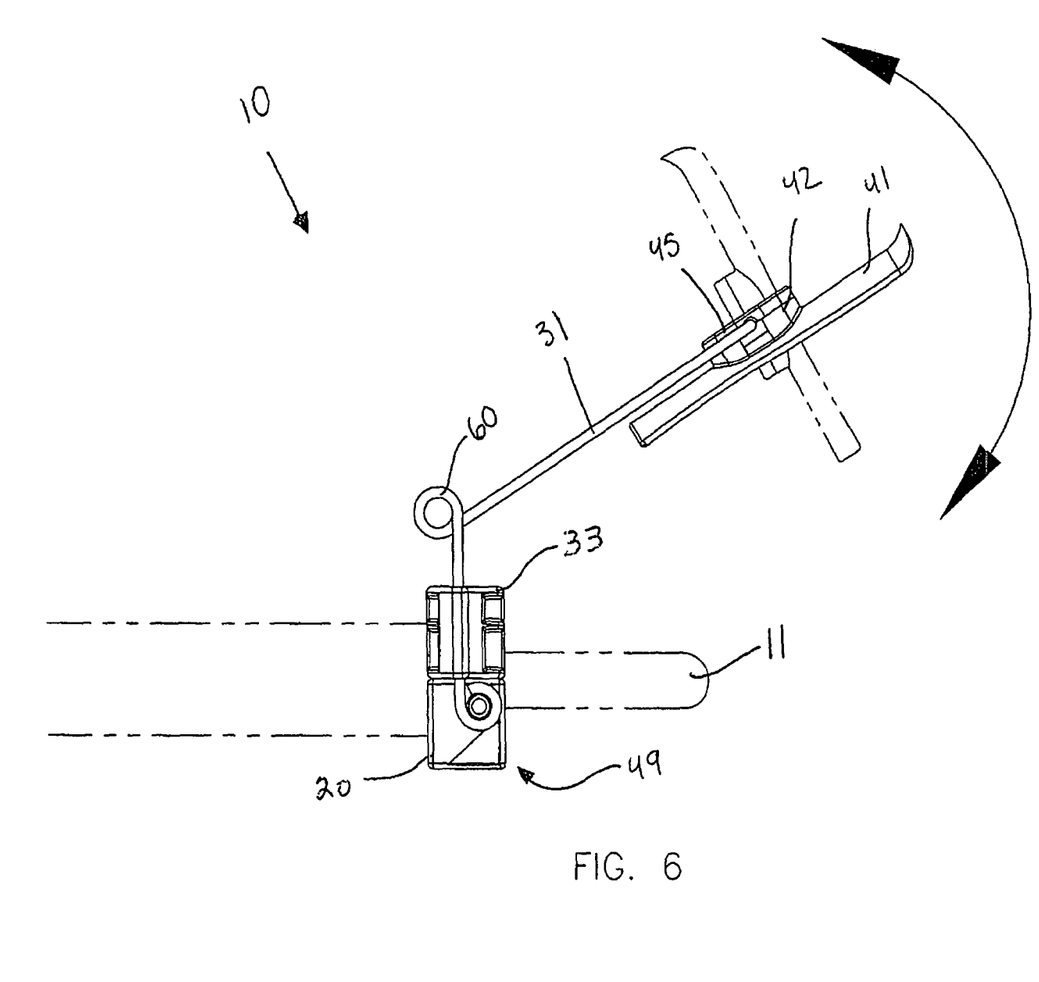
FIG. 6 is a perspective view showing the articulation of the apparatus, in accordance with the present invention.

Referring initially to FIGS. 1 and 6, the apparatus includes a block-shaped lower member 20 which conveniently has first 21 and second 22 upper surfaces provided with inner edges 23 extending inwardly from outer faces of the lower member 20 and terminating proximal to a centrally registered longitudinal axis of the lower member 20. Such a lower member 20 further has third 25 and fourth 26 upper surfaces monolithically formed with the inner edges 23 of the first and second upper surfaces respectively and oriented orthogonal thereto. Such third 25 and fourth 26 upper surfaces effectively have inner edges extending inwardly from the inner edges 23 of the first 21 and second 22 upper edges and further terminate proximal of the longitudinal axis. Such inner edges 23 of the third 25 and fourth 26 upper surfaces are advantageously disposed below the inner edges 23 of the first 21 and second 22 upper surfaces. The block-shaped lowered member provides a user the benefit of securely fixing the handle adaptor to the transport cart in order to prevent movement of the adaptors while fixed to the handles.

Referring again to FIGS. 1 and 6, the lower member 20 further has a fifth upper surface 27 monolithically formed with the inner edges 23 of the third 25 and fourth 26 upper surfaces respectively and positioned therebetween. Such a fifth surface 27 is conveniently located subjacent to the first 21 and second 22 upper surfaces respectively and is oriented parallel thereto. The lower member 20 further includes a pair of coextensively shaped posts 28 monolithically formed with the outside faces of the lower member. Such posts 28 effectively have a hollow passageway 29 formed therein and a centrally registered axis oriented perpendicular to the longitudinal axis of the lower member. The posts 28 further have apertures 30 advantageously formed in distal ends thereof respectively and oriented perpendicular to the centrally registered axis. The closed end of an extension resiliently articulates to a plurality of positions above an upper member and is thereby prohibited from pivoting below the lower member. The posts provide a means by which the extension can freely rotate in various positions both above and below the handles of a transport cart.

Figure 2:
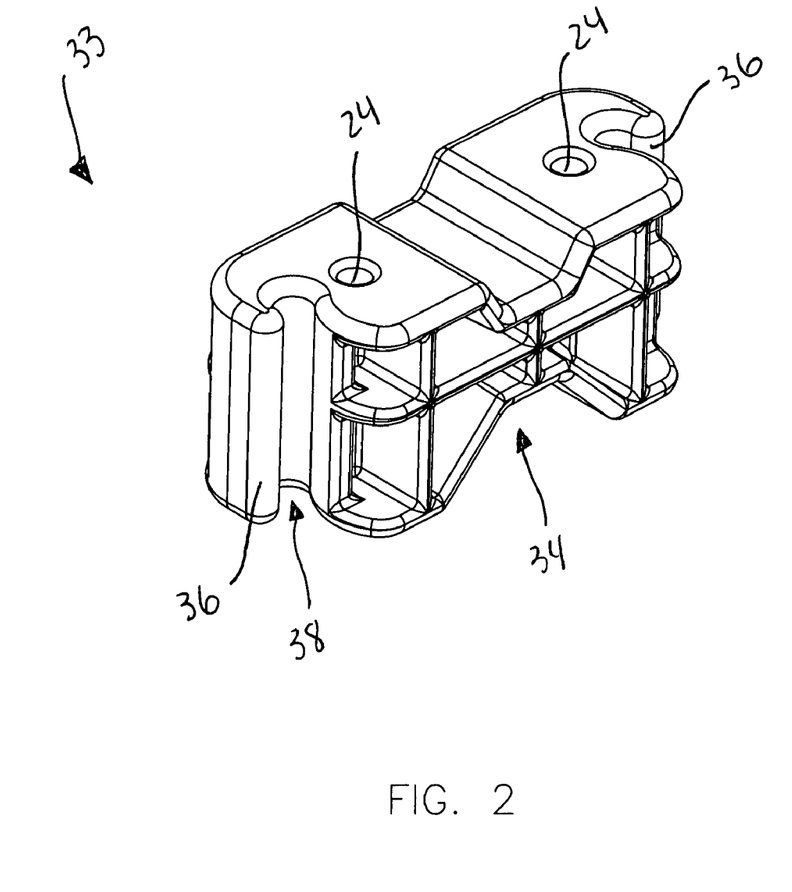
FIG. 2 is a perspective view of the upper member as shown in FIG. 6, in accordance with the present invention.

Referring to FIGS. 2 and 6, the apparatus further includes a block-shaped upper member 33 with lower surfaces 34 coextensively and inversely positioned with the upper surfaces 21, 22, 25, 26, 27 of the lower member 20 such that a passageway is formed therebetween when the upper and lower members 20, 33 are joined together. Such a passageway conveniently surrounds the proximal ends of the handles 11 of the transport cart during operating conditions. The upper member 33 further includes a curved flange 36 monolithically formed with outside faces of the upper member 37. Such a flange 36 effectively has a vertically oriented groove 38 formed therein and extends the entire height of the upper member 33. Such a groove 38 has an open face oriented toward the proximal ends of the handles 11 during operating conditions and the groove 38 receives and captures the extension 31 when the extension 31 is biased upwardly. The upper and lower members provide a mechanism for securing the extension to the handles of a transport cart.

Referring to FIGS. 1, 2 and 6, the upper and lower members 20, 33 have corresponding threaded passageways 24 formed therein respectively. Such passageways 24 are advantageously oriented at a right angle to the upper and lower surfaces 25, 34 which is critical such that the upper and lower members 20, 33 are threadably attached to each other about the proximal ends 35 of the handles 11 of the transport cart during operating conditions.

Figure 3:
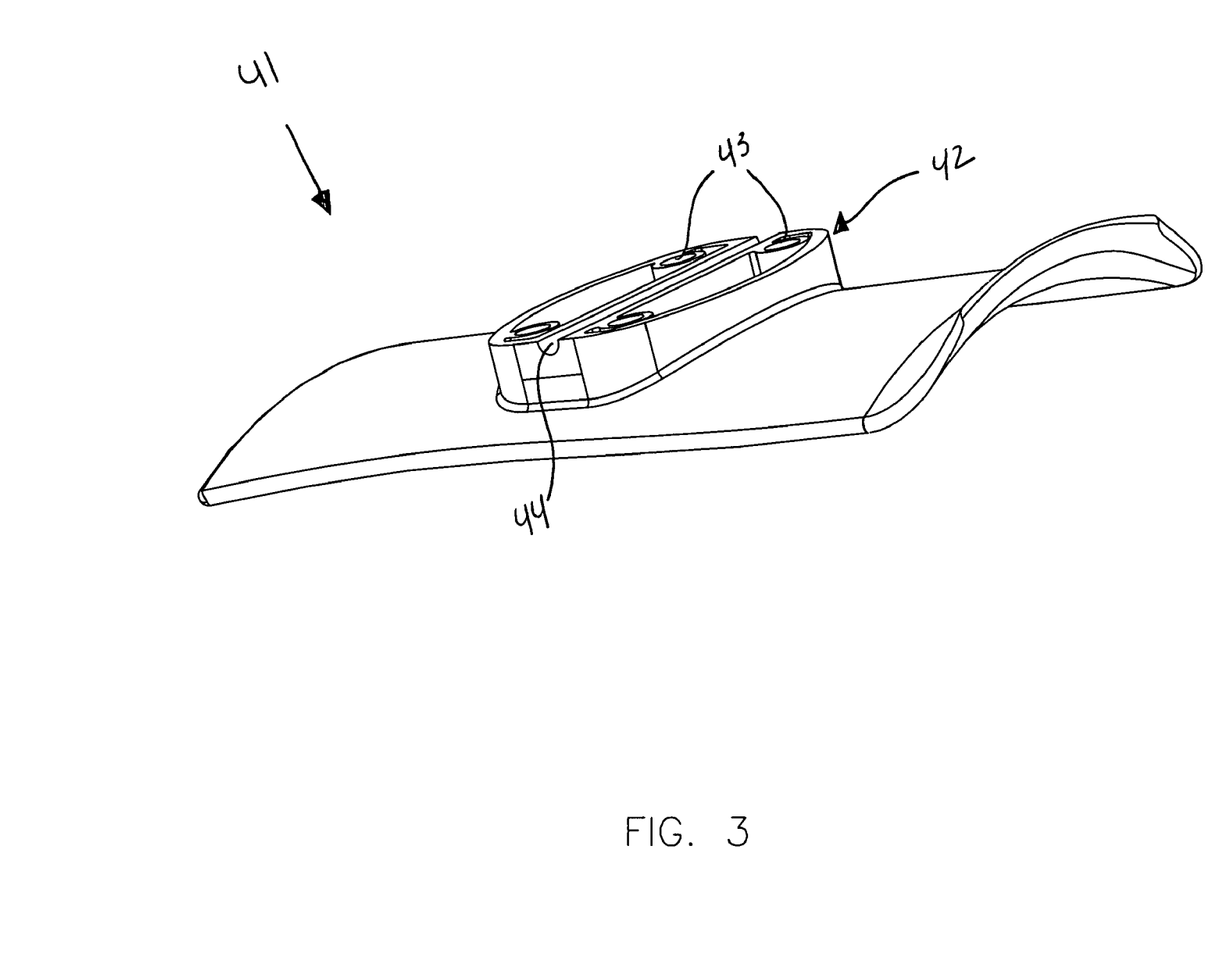
FIG. 3 is a perspective view of the support plate as shown in FIG. 6, in accordance with the present invention.
Figure 5:
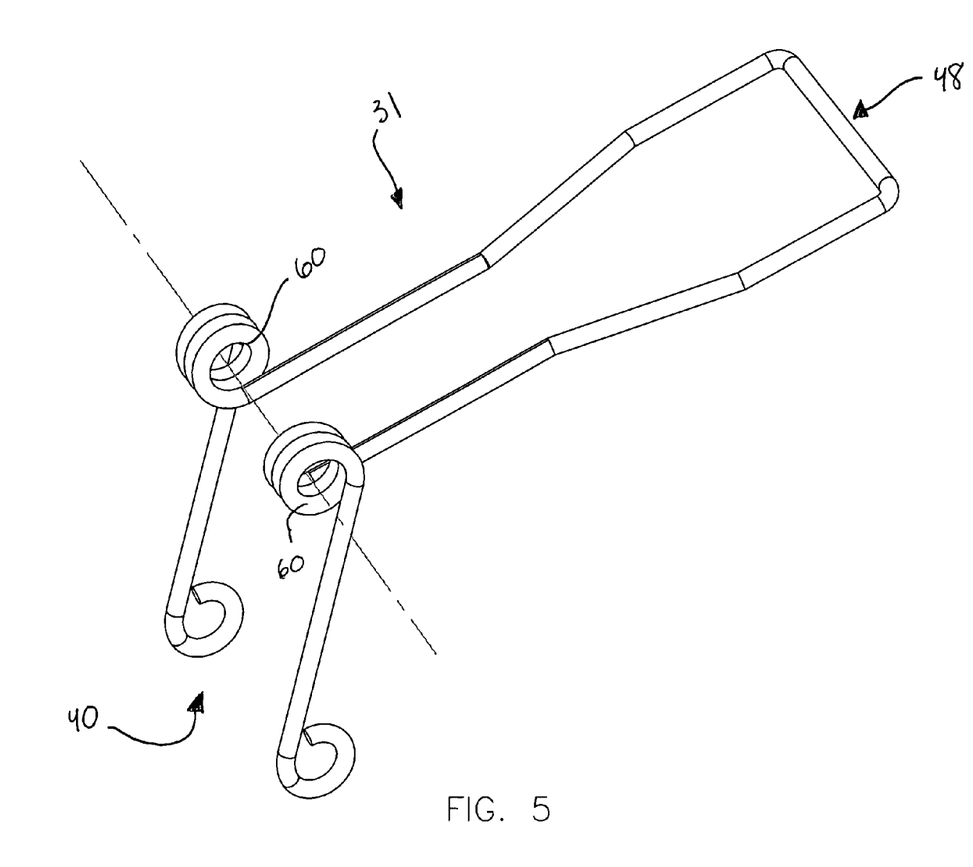
FIG. 5 is a perspective view of the extension as shown in FIG. 6, in accordance with the present invention.

Referring to FIGS. 3, 5 and 6, the apparatus further includes an extension 31 with an open end 40 removably attached to the outside faces of the lower member 20 and a curvilinear support plate 41 removably attached to a closed end 48 of the extension 31. Such a support plate 41 further includes a bracket 42 integrally attached to a top surface thereof. Such a bracket 42 conveniently has a plurality of shafts 43 formed therein and located at opposed corners thereof. The bracket 42 further has a centrally registered slot 44 monolithically formed therein and a longitudinal axis oriented perpendicular to a longitudinal length of the support plate 41. The extension can be moved either above or below the handles of a transport cart according to a user's needs. Positioning the extension above the handles will provide a user support, stability, and comfort to the wrist and forearm while operating a transport cart.

The extension further includes first and second pluralities of circular rings 60 monolithically formed generally medially between the closed and open ends respectively. Such first and second pluralities of circular rings 60 have substantially equal diameters and are juxtaposed adjacent to left and right sides of the open end such that a resilient tension is created when the closed end is articulated along an arcuate path defined above the upper member 33. The closed end 48 is pivotally about a fulcrum axis passing through a center of the first and second pluralities of the circular rings 60 whereby respective linear segments remain perpendicular to the fulcrum axis.

Figure 4:
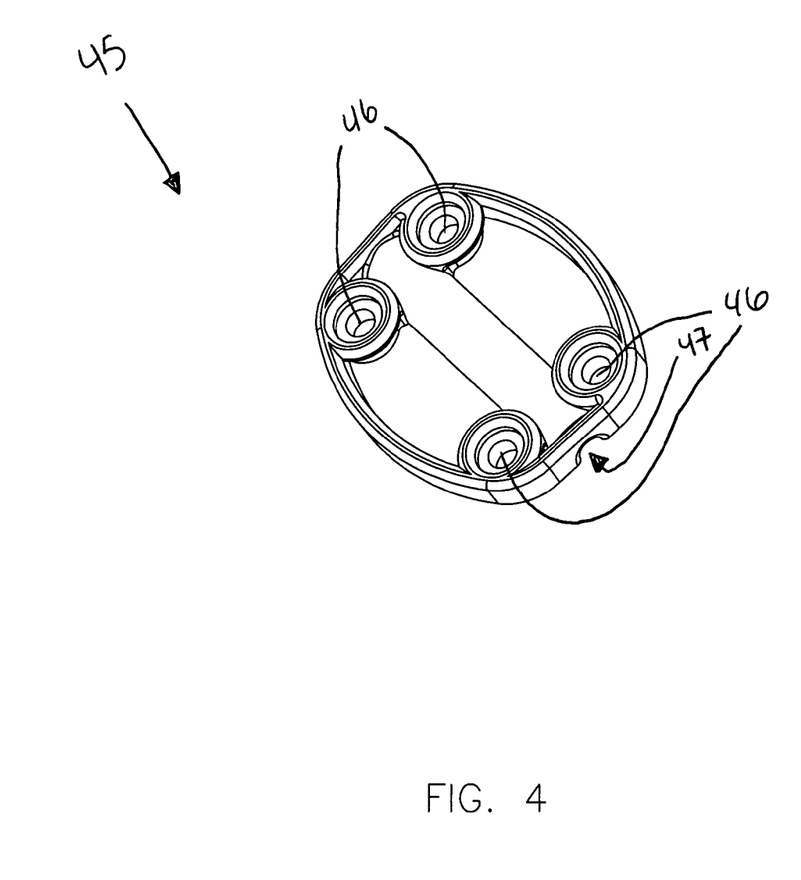
FIG. 4 is a perspective view of the bracket as shown in FIG. 3, in accordance with the present invention.
Figure 7:
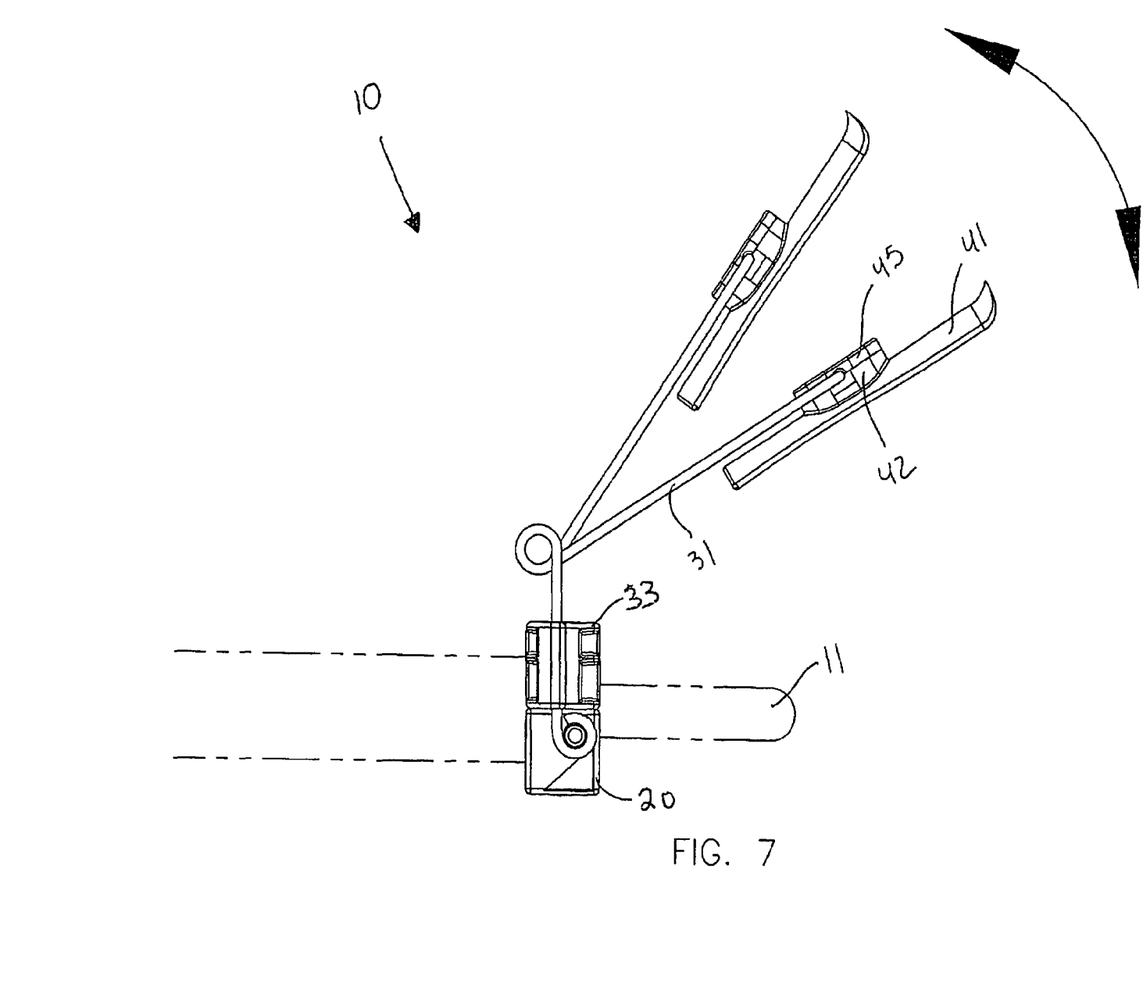
FIG. 7 is a perspective view of the resilient movement of the apparatus, in accordance with the present invention.

Referring to FIGS. 4 and 7, a cover 45 substantially similar in shape and size to the bracket 42 advantageously has a plurality of threaded apertures 46 formed therein and located at opposite corners thereof such that the apertures 46 correspond to associated ones of the shafts 43 when the cover 45 is threadably attached to the bracket 42. Such a cover 45 further has a centrally registered slot 47 formed therein. Such a cover slot 47 is in fluid communication with the bracket slot 44 when the cover 45 and the bracket 42 are threadably attached which is crucial such that a contiguous passageway is thereby formed. The closed end 48 of the extension 31 is conveniently interfitted within the passageway when the cover 45 is threadably attached to the bracket 42 and the support plate 41 is thereby freely pivoted about the closed end of the extension 31 during operating conditions. The cover provides the benefit of covering the bracket and apertures threaded therein while still allowing a user to freely pivot the extension to whichever position is most advantageous.

Referring to FIGS. 6 and 7, the apparatus further includes a mechanism for resiliently articulating the support plate 41 and the closed end 48 of the extension 31 in sync while the open end 40 of the extension 31 remains statically anchored to the lower member which is vital such that the support plate 41 and the closed end 48 of the extension 31 return to equilibrium after being articulated to a tensed position above the upper member. Such a resiliently articulating mechanism 49 effectively includes a plurality of cotter pins 61 removably penetrating the apertures 46 of the distal ends of the posts 28. Such cotter pins 61 prohibit the open end 40 of the U-shaped extension 31 from prematurely and undesirably disconnecting from the posts 28 during operating conditions while allowing the open end 40 of the extension 31 to freely rotate about the posts 28. The cotter pins 61 allow a user to freely position the extension and thereby prevent the extension from shifting directions sporadically.

A handle adaptor for transport carts and the like provides a user the unexpected benefit of an extension to lend support, stability and comfort to the wrists and forearms of a user. In addition, the cotter pins allow a user to adjust the location of the extension thereby allowing a user to position the extension inwardly when such support is not needed. Such benefits overcome the prior art shortcomings.

In use, a handle adaptor for transport carts is simple and easy to use. A method for assisting a user to operate a transport cart safely and easily includes the step of providing a block-shaped lower member 20. Such a lower member 20 has first and second upper surfaces 21, 22 provided with inner edges 23 extending inwardly from outer faces of the lower member 20 and terminating proximal to a centrally registered longitudinal axis of the lower member 20. The lower member 20 further has third and fourth upper surfaces 25, 26 monolithically formed with the inner edges of the first and second upper surfaces 21, 22 respectively and oriented orthogonal thereto. Such third and fourth upper surfaces 25, 26 have inner edges 23 extending inwardly from the inner edges of the first and second upper edges 21, 22 and terminate proximal of the longitudinal axis. Such inner edges 23 of the third and fourth upper surfaces 25, 26 are disposed below the inner edges of the first and second upper surfaces 21, 22. The lower member 20 further has a fifth upper surface 27 monolithically formed with the inner edges 23 of the third and fourth upper surfaces 25, 26 respectively and positioned therebetween. Such a fifth surface 27 is located subjacent to the first and second upper surfaces 21, 22 respectively and is oriented parallel thereto.

In use, the method further includes these steps of providing a block-shaped upper member 33 with lower surfaces 34 coextensively and inversely positioned with the upper surfaces 21, 22, 25, 26, 27 of the lower member 20 such that a passageway 29 is formed therebetween when the upper and lower members 20, 33 are joined together. Such a passageway 29 surrounds the proximal ends 35 of the handles 11 of the transport cart during operating conditions.

In use, the steps further include: threadably attaching the upper and lower members 20, 33 to each other and about the proximal ends of the handles 11 of the transport cart; removably and pivotally attaching an open end of an extension 31 to the outside faces of the lower member 20; removably attaching a curvilinear support plate 41 to a closed end 48 of the extension 31; and adjustably positioning the extension 31 about the proximal ends of the handles 11 of the transport cart.

In use, the method further includes these steps of: providing a pair of coextensively shaped posts 28 monolithically formed with the outside faces 24 of the lower member 20 and interfitting the open end 40 of the extension 31 about the posts 28 such that the extension 31 is biased to a multitude of positions above and below the proximal ends of the handles 11 during operating conditions. The posts 28 have a hollow passageway formed therein and a centrally registered axis oriented perpendicular to the longitudinal axis of the lower member 20. The posts 28 further have apertures 46 formed in distal ends thereof respectively and oriented perpendicular to the centrally registered axis.

In use, the method further includes these steps of: biasing the extension 31 upwardly and receiving and capturing the extension 31 within a groove 38 formed in a curved flange 36 monolithically formed with outside faces of the upper member 37. Such a flange 36 extends the entire height of the upper member 33. Such a groove 38 has an open face 39 oriented toward the proximal ends 35 of the handles 11 during operating conditions.

In use, the method further includes the step of integrally attaching a bracket 42 to a top surface of the support plate 41. Such a bracket 42 has a plurality of shafts 43 formed therein and located at opposed corners thereof. The bracket 42 further has a centrally registered slot 44 monolithically formed therein and a longitudinal axis oriented perpendicular to a longitudinal length of the support plate 41. The steps further include attaching a cover 47 to the bracket 42. Such a cover 47 is substantially similar in shape and size to the bracket 42 and has a plurality of apertures 46 formed therein and located at opposite corners thereof such that the apertures 46 correspond to associated ones of the shafts 43 when the cover 47 is attached to the bracket 42. The cover 47 further has a centrally registered slot 47 formed therein and is in fluid communication with the bracket slot 44 when the cover 47 and the bracket 42 are attached such that a contiguous passageway is thereby formed.

In use, the method further includes the step of interfitting the closed end 48 of the extension within the passageway when the cover 45 is threadably attached to the bracket 42 such that the support plate 41 is thereby freely pivoted about the closed end 48 of the extension 31 during operating conditions; and removably penetrating the apertures 46 of the distal ends of the posts 28 with a plurality of cotter pins, the cotter pins prohibiting the open end of the extension 31 from prematurely and undesirably disconnecting from the posts 28 during operating conditions while allowing the open end of the extension to freely rotate about the posts 28.

In use, the method further includes the steps of: providing first and second pluralities of circular rings 60 monolithically formed generally medially between the closed and open ends respectively; creating a resilient tension at the first and second pluralities of circular rings 60 by articulating the closed end along an arcuate path defined above the upper member; and maintaining respective linear extension segments perpendicular to a fulcrum axis passing through the first and second pluralities of circular rings 60.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A handle adaptor for assisting a user to operate an existing cart safely and easily, said handle adaptor comprising:

a lower member having first and second upper surfaces provided with inner edges extending inwardly from outer faces of said lower member and terminating proximal to a center of said lower member, said lower member further having third and fourth upper surfaces monolithically formed with said inner edges of said first and second upper surfaces respectively and oriented orthogonal thereto, said third and fourth upper surfaces having inner edges extending inwardly from said inner edges of said first and second upper edges and further terminating proximal to the center of said lower member, said inner edges of said third and fourth upper surfaces being disposed below said inner edges of said first and second upper surfaces, said lower member further having a fifth upper surface monolithically formed with said inner edges of said third and fourth upper surfaces respectively and positioned therebetween, said fifth surface being located subjacent to said first and second upper surfaces respectively and further being oriented parallel thereto;

an upper member having a plurality of lower surfaces coextensively and inversely positioned with said upper surfaces of said lower member such that a passageway is formed therebetween when said upper and lower members are joined together, said passageway surrounding a portion of the existing cart during operating conditions;

an extension having an open end removably attached to said outside faces of said lower member;

a curvilinear support plate removably attached to a closed end of said extension; and means for resiliently articulating said support plate and said closed end of said extension in sync while said open end of said extension remains statically anchored to said lower member such that said support plate and said closed end of said extension return to equilibrium after being articulated to a tensed position above said upper member;

wherein said lower member further comprises a pair of coextensively shaped posts monolithically formed with said outside faces of said lower member, said posts having a hollow passageway formed therein and a centrally registered axis oriented parallel to a longitudinal axis of said lower member, said posts further having apertures formed in distal ends thereof respectively and oriented perpendicular to the longitudinal axis;

wherein said open end of said extension abuts directly about said posts such that said closed end of said extension resiliently articulates to a plurality of positions above said upper member and thereby prohibited from pivoting below said lower member;

wherein said upper member further comprises a plurality of curved flanges monolithically formed with outside faces of said upper member, said flanges having a vertically oriented groove formed therein and extending along an entire height of said upper member, said groove having an open face oriented toward the portion of the existing cart during operating conditions, said groove receiving and capturing said extension.

2. The handle adaptor of claim 1, wherein said support plate further comprises:

a bracket integrally attached to a top surface thereof, said bracket having a plurality of holes formed therein and located at opposed corners thereof, said bracket further having a centrally registered slot monolithically formed therein, said bracket slot having a longitudinal axis oriented perpendicular to a longitudinal length of said support plate; and a cover removably attached to said bracket, said cover having a plurality of apertures formed at opposite corners thereof such that said apertures become vertically aligned with associated ones of said holes when said cover is attached to said bracket, said cover further having a centrally registered slot formed therein, said cover slot being in fluid communication with said bracket slot when said cover and said bracket are attached such that a contiguous passageway is formed therebetween;

wherein said closed end of said extension is interfitted within said passageway when said cover is attached to said bracket such that said support plate is freely pivoted about said closed end of said extension during operating conditions while said lower and upper members remain statically affixed to the portion of the existing cart.

3. The handle adaptor of claim 2, wherein said resiliently articulating means comprises:

a plurality of cotter pins removably penetrating through said apertures of said distal ends of said posts, said cotter pins prohibiting said open end of said extension from prematurely and undesirably disconnecting from said posts during operating conditions while allowing said open end of said extension to resiliently travel about a restricted arcuate path defined above said upper member.

4. The handle adaptor of claim 1, wherein said extension further comprises: first and second pluralities of circular rings monolithically formed generally medially between said closed and open ends respectively, said first and second pluralities of circular rings having substantially equal diameters and being juxtaposed adjacent to left and right sides of said open end such that a resilient tension is created when said closed end is articulated along an arcuate path defined above said upper member, said closed end being pivotally about a fulcrum axis passing through a center of said first and second pluralities of circular rings whereby respective linear extension segments remain perpendicular to the fulcrum axis.

5. A handle adaptor for assisting a user to operate an existing cart safely and easily, said handle adaptor comprising:

a lower member having first and second upper surfaces provided with inner edges extending inwardly from outer faces of said lower member and terminating proximal to a center of said lower member, said lower member further having third and fourth upper surfaces monolithically formed with said inner edges of said first and second upper surfaces respectively and oriented orthogonal thereto, said third and fourth upper surfaces having inner edges extending inwardly from said inner edges of said first and second upper edges and further terminating proximal to the center of said lower member, said inner edges of said third and fourth upper surfaces being disposed below said inner edges of said first and second upper surfaces, said lower member further having a fifth upper surface monolithically formed with said inner edges of said third and fourth upper surfaces respectively and positioned therebetween, said fifth surface being located subjacent to said first and second upper surfaces respectively and further being oriented parallel thereto;

an upper member having a plurality of lower surfaces coextensively and inversely positioned with said upper surfaces of said lower member such that a passageway is formed therebetween when said upper and lower members are joined together, said passageway surrounding a portion of the existing cart during operating conditions;

an extension having an open end removably attached to said outside faces of said lower member;

a curvilinear support plate removably attached to a closed end of said extension; and means for resiliently articulating said support plate and said closed end of said extension in sync while said open end of said extension remains statically anchored to said lower member such that said support plate and said closed end of said extension return to equilibrium after being articulated to a tensed position above said upper member, wherein said open end is registered orthogonal to the portion of the existing cart while said closed end is resiliently biased between the tensed position and equilibrium;

wherein said lower member further comprises a pair of coextensively shaped posts monolithically formed with said outside faces of said lower member, said posts having a hollow passageway formed therein and a centrally registered axis oriented parallel to a longitudinal axis of said lower member, said posts further having apertures formed in distal ends thereof respectively and oriented perpendicular to the longitudinal axis;

wherein said open end of said extension abuts directly about said posts such that said closed end of said extension resiliently articulates to a plurality of positions above said upper member and thereby prohibited from pivoting below said lower member;

wherein said upper member further comprises a plurality of curved flanges monolithically formed with outside faces of said upper member, said flanges having a vertically oriented groove formed therein and extending along an entire height of said upper member, said groove having an open face oriented toward the portion of the existing cart during operating conditions, said groove receiving and capturing said extension.

6. The handle adaptor of claim 5, wherein said support plate further comprises:

a bracket integrally attached to a top surface thereof, said bracket having a plurality of holes formed therein and located at opposed corners thereof, said bracket further having a centrally registered slot monolithically formed therein, said bracket slot having a longitudinal axis oriented perpendicular to a longitudinal length of said support plate; and a cover removably attached to said bracket, said cover having a plurality of apertures formed at opposite corners thereof such that said apertures become vertically aligned with associated ones of said holes when said cover is attached to said bracket, said cover further having a centrally registered slot formed therein, said cover slot being in fluid communication with said bracket slot when said cover and said bracket are attached such that a contiguous passageway is formed therebetween;

wherein said closed end of said extension is interfitted within said passageway when said cover is attached to said bracket such that said support plate is freely pivoted about said closed end of said extension during operating conditions while said lower and upper members remain statically affixed to the portion of the existing cart.

7. The handle adaptor of claim 6, wherein said resiliently articulating means comprises:

a plurality of cotter pins removably penetrating through said apertures of said distal ends of said posts, said cotter pins prohibiting said open end of said extension from prematurely and undesirably disconnecting from said posts during operating conditions while allowing said open end of said extension to resiliently travel about a restricted arcuate path defined above said upper member.

8. The handle adaptor of claim 5, wherein said extension further comprises: first and second pluralities of circular rings monolithically formed generally medially between said closed and open ends respectively, said first and second pluralities of circular rings having substantially equal diameters and being juxtaposed adjacent to left and right sides of said open end such that a resilient tension is created when said closed end is articulated along an arcuate path defined above said upper member, said closed end being pivotally about a fulcrum axis passing through a center of said first and second pluralities of circular rings whereby respective linear extension segments remain perpendicular to the fulcrum axis.

* * * * *